(12) United States Patent
Bantas et al.

(10) Patent No.: US 8,250,506 B2
(45) Date of Patent: Aug. 21, 2012

(54) BONDWIRE DESIGN

(75) Inventors: Sotirios Bantas, Athens (GR); Konstantinos Nikellis, Athens (GR)

(73) Assignee: Helic S.A., Maroussi, Athens (GR)

( * ) Notice: Subject to any disclaimer, the term of this patent is extended or adjusted under 35 U.S.C. 154(b) by 486 days.

(21) Appl. No.: 12/359,131

(22) Filed: Jan. 23, 2009

(65) Prior Publication Data

US 2009/0193370 A1 Jul. 30, 2009

(30) Foreign Application Priority Data

Jan. 25, 2008 (GB) .................................. 0801411.0
Aug. 29, 2008 (GB) .................................. 0815745.5

(51) Int. Cl.
*G06F 17/50* (2006.01)
(52) U.S. Cl. ..................................................... 716/110
(58) Field of Classification Search ................... 716/100, 716/110
See application file for complete search history.

(56) References Cited

U.S. PATENT DOCUMENTS

| | | | | |
|---|---|---|---|---|
| 5,694,344 | A * | 12/1997 | Yip et al. ........................ | 703/2 |
| 2003/0181003 | A1* | 9/2003 | Akram ........................... | 438/200 |
| 2005/0114807 | A1 | 5/2005 | Gasparik | |
| 2005/0251378 | A1* | 11/2005 | Zhao ............................... | 703/14 |
| 2009/0273074 | A1* | 11/2009 | Li .................................... | 257/692 |
| 2010/0094609 | A1* | 4/2010 | Han et al. ....................... | 703/14 |
| 2010/0120198 | A1* | 5/2010 | Appel et al. ................... | 438/106 |
| 2010/0332193 | A1* | 12/2010 | Hu et al. ......................... | 703/1 |

OTHER PUBLICATIONS

Harm, et al., "Modeling and Simulation of Hybrid RF Circuits Using a Versatile Compact Bondwire Model", 28th European Microwave Conference Amsterdam 1998, pp. 529-534 (6 pages).
Yeo, et al., "A Novel Wire Bonded Plastic Chip Scale Package for RF and Microwave Applications", 2002 Electronic Components and Technology Conference, pp. 1037-1044 (8 pages).
Patterson, "Analysis of Ground Bond Wire Arrays for RFICs", Radio Frequency Integrated Circuits Symposium, 1997, pp. 237-240 (4 pages).
Doerr, et al., "Parameterized Models for a RF Chip-to-Substrate Interconnect", Electronic Components and Technology Conference, 2001, pp. 822-828 (7 pages).
Han, et al., "Analysis of Horizontal and Vertical Couplings in Bonding Wire Interconnections Using EFIE with Cylindrical Conduction Mode Basis Functions", Signal Propagation on Interconnects, 2008, pp. 1-4 (4 pages).
Shen, "Chip-Package Co-Design for High Performance and Reliability Off-Chip Communications", High Density Microsystem Design and Packaging and Component Failure an Analysis, HDP 2004, pp. 31-36 (6 pages).
European Search Report in re Application No. 09151284.8 dated Jun. 5, 2009 (7 pages).
Tsigopoulos, A., et al., "Electrical crosstalk analysis due to bondwire capacitive induced coupling in OEIC transceiver modules," Optoelectronics, vol. 11, No. 4, pp. 239-246, 1997.
Alimenti, F., et al., "Modeling and characterization of the bonding-wire interconnection," IEEE Trans. Microwave Theory and Techniques, vol. 49, No. 1, Jan. 2001, pp. 142-150.
Kai, BJ, et al., "High speed interface wirebond modeling division methodology," 2006 8th International Conferences on Electronic Materials and Packaging, Dec. 11-14, 2006, pp. 253-257.

* cited by examiner

*Primary Examiner* — Suchin Parihar
(74) *Attorney, Agent, or Firm* — Fliesler Meyer LLP

(57) ABSTRACT

A system and method of designing the physical shape of and determining the electromagnetic characteristics of a bondwire in an electrical circuit, comprising the steps of enabling a user to define the position of the bondwire in the electrical circuit layout, defining the position and loop shape of the bondwire in a 3D representation of the electrical circuit, segmenting the bondwire into discrete segments, determining the electromagnetic characteristics of each of the bondwire segments thereby to determine the overall electromagnetic characteristics of the bondwire.

23 Claims, 13 Drawing Sheets

Figure 10

| | | | | | |
|---|---|---|---|---|---|
| L_bond_0_0 | p3 | p3_m | 3.20833e-11 | | |
| R_bond_0_0 | p3_2 | p3_2_m | 0.00304391 | | |
| L_bond_0_1 | p3_2 | p3_2_m | 1.71283e-11 | | |
| R_bond_0_1 | p3_3 | p3_3_m | 0.00207786 | | |
| L_bond_0_2 | p3_3 | p3_3_m | 5.79295e-11 | | |
| R_bond_0_2 | p3_4 | p3_4_m | 0.00449555 | | |
| L_bond_0_3 | p3_4 | p3_4_m | 1.44484e-10 | | |
| R_bond_0_3 | p4 | p4 | 0.00860462 | sbstr | 1e-18 |
| Cpl_0 | | | | | |
| L_bond_1_0 | p1 | p1_m | 3.20833e-11 | | |
| R_bond_1_0 | p1_2 | p1_2_m | 0.00304391 | | |
| L_bond_1_1 | p1_2 | p1_2_m | 1.71283e-11 | | |
| R_bond_1_1 | p1_3 | p1_3_m | 0.00207786 | | |
| L_bond_1_2 | p1_3 | p1_3_m | 5.79295e-11 | | |
| R_bond_1_2 | p1_4 | p1_4_m | 0.00449555 | | |
| L_bond_1_3 | p1_4 | p1_4_m | 1.44484e-10 | | |
| R_bond_1_3 | p2 | p2 | 0.00860462 | sbstr | 1e-18 |
| Cpl_1 | | | | | |

240 Self inductance & resistance circuit components

| | | | |
|---|---|---|---|
| Km_bond_0_0_1 | L_bond_0_0 | L_bond_0_1 | 0.276955 |
| Km_bond_0_0_2 | L_bond_0_0 | L_bond_0_2 | 0.101039 |
| Km_bond_0_0_3 | L_bond_0_0 | L_bond_0_3 | 0.035663 |
| Km_bond_0_1_2 | L_bond_0_1 | L_bond_0_2 | 0.391011 |
| Km_bond_0_0_1_0 | L_bond_0_0 | p3 p1 | 0.128727 |
| CpA_bond_0_0_1_0 | | p3_2 pl_2 | 4.9161e-16 |
| CpB_bond_0_0_1_0 | | | 4.9161e-16 |
| Km_bond_0_0_1_1 | L_bond_0_0 | p3 p1_2 | 0.066343 |
| CpA_bond_0_0_1_1 | | p3_2 pl_3 | 9.31439e-32 |
| CpB_bond_0_0_1_1 | | | 9.31439e-32 |

242 Mutual coupling circuit components

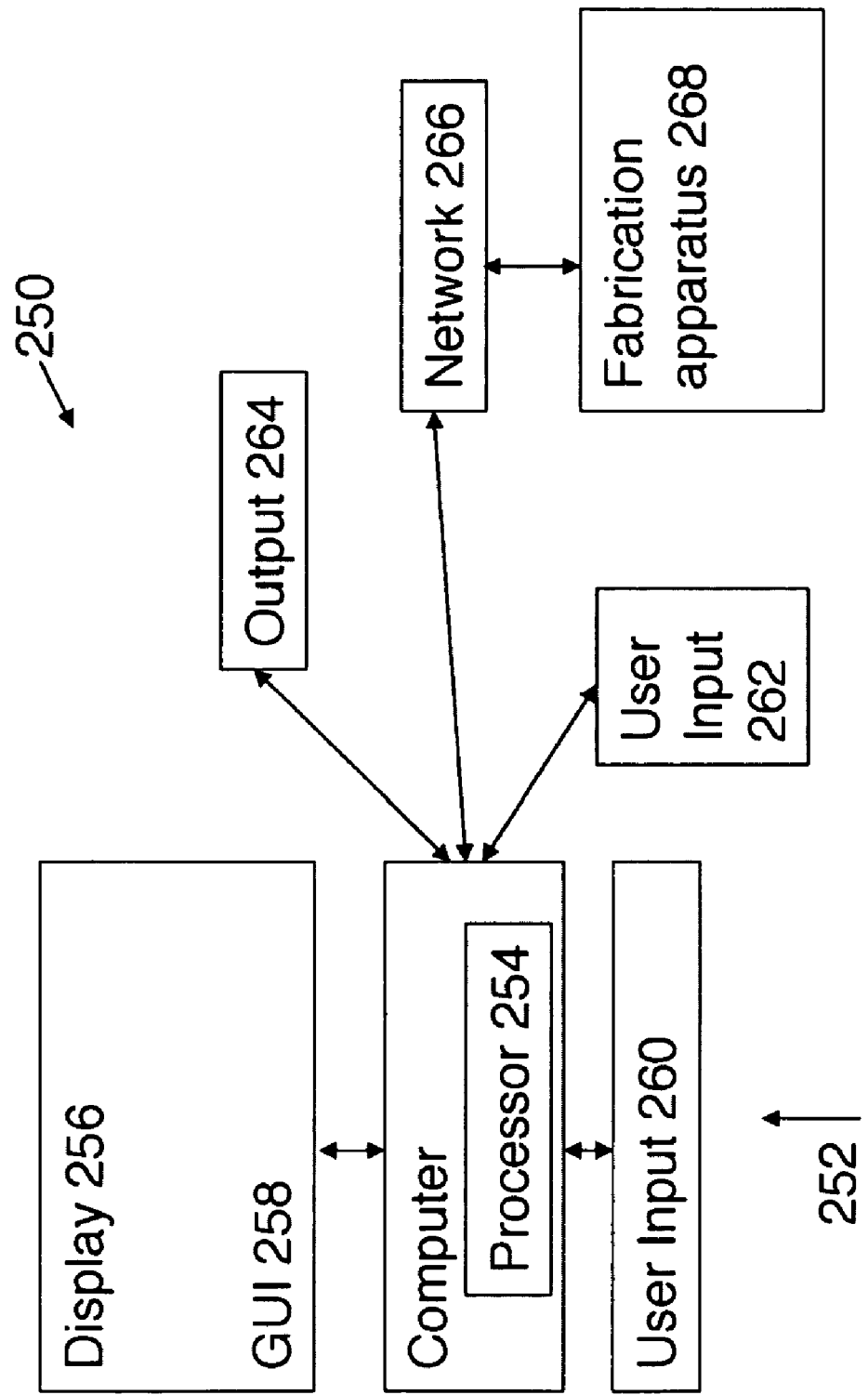

BONDWIRE DESIGN

The work that led to the development of this invention, was co-financed by Hellenic Funds and by the European Regional Development Fund (ERDF) under the Hellenic National Strategic Reference Framework (NSRF) 2007-2013, according to Contract no. MICRO2-15 of the Project "Business Development Support Actions—HELIC" within the Programme "Hellenic Technology Clusters in Microelectronics— Phase-2 Aid Measure".

TECHNICAL FIELD

The invention relates in general to semiconductor packages, and particularly to systems for providing electromagnetic modelling of semiconductor package bondwires. In particular but not exclusively, the invention relates to a method of modelling bondwire interconnects in a design environment, for use in known integrated circuit modelling. Additionally, the invention also relates to a method of modelling the electromagnetic behaviour of a bondwire using a method more efficient than the prior art.

BACKGROUND TO THE INVENTION

Semiconductor packages house and protect semiconductor devices from the external environment of the package, and provide electrical connection from the semiconductor devices to the exterior of the package. One of the most widely adopted methods for electrical connection between the semiconductor die and the semiconductor package that encapsulates the die is through bondwire assembly (also known as wire bonding).

The diagram show in FIG. 1 is typically referred to in the industry as a 'bonding diagram'. It is essentially an overlay of the top view of IC die and package, with straight lines depicting the bondwires that electrically connect the IC with the package. Bonding diagrams are the usual means of communication between IC package designers and assembly houses which provide wire bonding services. The information contained in a bonding diagram is in two dimensions and is sufficient to define IC and package connectivity, but is not sufficient for enabling electromagnetic modelling of bondwires.

The wide use of bondwires is mainly attributed to the fact that they are a versatile and low-cost assembly option for a wide range of integrated circuit (IC) packages. However, in high-speed and high-frequency IC design, bondwires introduce parasitics such as inductance and magnetic coupling which may affect product performance significantly. To meet demanding product specifications and time-to-market requirements, IC designers need the ability to easily draw, model and optimize bondwire as part of circuit design. Therefore, the existence of an Electronic Design Automation (EDA) tool that allows the rapid and accurate modelling of the electromagnetic behaviour of bondwires is vital to ensure that the combination of semiconductor die and package will meet required specifications.

However, most EDA tools found in the prior art are focused on integrated circuit design. Several tools and methodologies have been developed in the past that allow the fast and accurate modelling of metallic interconnects belonging to a semiconductor die layout. Some of these methodologies are based on equivalent circuit extraction. In such methodologies, the interconnect structures of the integrated circuit are divided into smaller sections, and each section is modelled by an equivalent circuit that models its electromagnetic behaviour, including electrical behaviour, along with any parasitic couplings to the substrate or other nearby structures. The aforementioned methodologies are usually fast and efficient. Their output is usually a circuit netlist comprising R (resistor) and C (capacitor) lumped elements. Commercial EDA tools such as Diva® and Assura® RCX of Cadence and Calibre® xRC of Mentor Graphics fall under this category. Some methods are also capable of producing L (inductance) and K (mutual inductance) elements, which besides R, C are required to accurately model the EM behaviour at higher frequencies. Commercial FDA tools that fall under the latter category include VeloceRF™ of Helic. However, even though bondwires may conceptually be considered as an extension of the metallic interconnects on an IC die, none of the aforementioned commercial tools and related methodologies in the prior art are applicable to the modelling of bondwires.

It is known in electromagnetic (EM) modelling of packages (including bondwires), for design and test engineers to use simulator tools, known as EM solvers, that employ numerical electromagnetic modelling methodologies. These tools are invariably based on Maxwell's equations, and attempt to solve them using various known numerical techniques such as Method of Moments {MoM), Finite Elements Method (FEM), Finite Differences Time Domain (FDTD). The main advantage of these methods is their wide applicability as they are able to generate models for complex three-dimensional (3D) geometries that comprise a semiconductor package. Commercial EM solvers include HFSS® of Ansoft and Momentum® of Agilent Technologies.

However, a disadvantage of such numerical methods is that they are extremely time and memory consuming. The effective description of the EM fields requires equations that cannot be solved analytically and require numerical solutions which often generate very large matrices and employ iterative procedures that may be slow to converge to a solution. Due to the complexity of a typical semiconductor package, often comprising large numbers of pins and multiple levels of interconnects, simulation time for a single package can last several hours or even days. Given the time taken to model the EM fields of bondwires, it is desirable to be able to model these fields in a more efficient manner with minimal loss in the accuracy or the model.

An additional drawback of known EM solvers is the lack of integration between package and integrated circuit design. As discussed previously, most IC design tools utilize equivalent circuits that are simulated by electronic circuit simulators (such as SPICE). On the other hand, most package design tools use numerical electromagnetic tools that yield the results in the form of network parameters, making integration and co-simulation with the die difficult. An attempt to solve these drawbacks was the introduction of the Partial Element Equivalent Circuit (PEEC) method. This method discretizes the electromagnetic problem to a vast array of equivalent circuit elements, and can be applied for the modelling of multilayered die and package substrates. Even though it manages to relate the electromagnetic problem to a circuit implementation, it does so at the cost of generating large and complex netlists that often lead to a prohibitively high computing cost (in terms of both time and memory) for simulation. It is therefore desirable to be able to integrate the IC and EM modelling in order to reduce computational costs and to improve efficiency when designing circuits that incorporate bondwires.

Several modifications have been proposed in the past to improve the methodologies used for package simulation, and overcome some of their major drawbacks. US patent 20050251378 claims a method that is based on a modification of the PEEC methodology, allowing the discretization of only the metallization instead of the whole structure, thus improving the overall performance of the method. In U.S. Pat. No. 5,694,344, a method is claimed for electrically modelling planar interconnects in a semiconductor package; this method is in accordance with techniques implemented in IC layout extraction tools.

However, the aforementioned improvements take advantage of the multi-layer nature of the semiconductor die or package, comprising wirings extending on multiple planar layers, with vertical interconnects providing connectivity between them. This specific layered structure of integrated circuits and package substrates, known as 2.5 dimensional space, allows the utilization of such techniques that enhance the performance of the method applied. When it comes to the modelling of bondwire interconnects, such methodologies cannot be applied. Bondwires have complex 3D shapes extending in all directions in three-dimensional (3D) space. Furthermore, their shape varies and unlike the metallization in layered media, they do not follow regular geometric patterns and therefore these inventions are unable to solve the problems in the modelling of bondwires mentioned above.

In this respect, when it comes to bondwire modelling with the prior art designers utilise EM solvers that make use of one of the aforementioned general-purpose numerical techniques. Since most modern IC packages offer high pin counts with resultantly large scales of integration, the amount and complexity of the bondwire interconnects is in most cases too great to be effectively handled by the existing tools.

Therefore, a system and method that could offer accurate modelling of bondwire interconnects in a short amount of time, and produce models that can easily be co-simulated with integrated circuit netlists, would be of great benefit to IC designers over the prior art.

Accordingly some known deficiencies in the prior art are that the prior art is currently unable to:
1. Define and model bondwire interconnects in the same environment that is used for IC circuit design and layout extraction, without the need for external tools.
2. Model bondwire interconnects in three dimensions, using methodologies of similar nature to the well-known techniques used in the extraction of IC layouts, techniques that are faster and more efficient than conventional EM solvers.

SUMMARY OF INVENTION

According to one aspect of the invention there is provided a method of designing the physical shape of and determining the electromagnetic characteristics of a bondwire in an electrical circuit, comprising the steps of
enabling a user to define the position of the bondwire in the electrical circuit layout,
defining the 3D form of the bondwire in the electrical circuit,
segmenting the bondwire into discrete segments,
determining the electromagnetic characteristics of each of the bondwire segments thereby to determine the overall electromagnetic characteristics of the bondwire.

Another aspect provides apparatus for determining the electromagnetic characteristics of a bondwire in an electrical circuit, comprising a user interface to enable a user to define the position of the bondwire in the electrical circuit, a processor adapted to determine the position of the bondwire in a 3D representation of the electrical circuit and to segment the bondwire into discrete segments, and determining the electromagnetic characteristics of each of the bondwire segments thereby to determine the overall electromagnetic characteristics of the bondwire.

Other aspects and features of the invention will be apparent from the specification as a whole as well as the claims appended hereto. The following summary is provided to facilitate an understanding of some of the innovative features unique to the embodiments disclosed and is not intended to be a full description. A full appreciation of the various aspects of the present invention can be gained by considering the entire specification, claims, drawings and abstract as a whole.

The present invention comprises a program and computer system for the design and modeling of bondwire interconnects. The simulator represents the system of bondwire interconnects through a netlist of discrete components. The circuit-based nature of the resulting model enables its use in simulations together with the integrated circuit model, ensuring the faster and more efficient simulation of integrated circuits.

An embodiment of the present invention comprises a method for designing the layout of bondwire interconnects in a two-dimensional layout editing system. The editing system may also contain outline drawings of one or more IC dice and one or more package elements, thus ensuring that bondwire layout projections in two dimensions are as accurate as possible. The requisite third dimension describing the loop shape of the bondwire above the IC and package is annotated by means of suitable parameters stored in the bondwire drawing object.

Another embodiment of the present invention comprises a method for modelling and simulating bondwires. The method involves constructing a three-dimensional geometric model of the bondwire shape and discretizing it into smaller segments. The resulting set of segments is subsequently represented by a netlist of lumped circuit elements that effectively captures all electromagnetic interactions between segments. The netlist thus constructed accurately models the electromagnetic behaviour of the complete system of bondwire interconnects.

In accordance to another embodiment of the present invention, for each one of the created segments, self-inductance and resistance (including conductor skin and proximity effects) are calculated and represented in the netlist by suitable circuit elements.

In accordance to another embodiment of the present invention, for each pair of the created segments, the mutual inductive and capacitive interaction is calculated and represented in the netlist by suitable circuit elements.

In accordance to another embodiment of the present invention, for each of the created segments, the inductive and capacitive interaction between the segment and a defined reference plane is calculated and represented in the netlist by suitable circuit elements.

Other aspects and advantages of the present invention will become apparent to those skilled in the art from reading the following detailed description in conjunction with the accompanying drawings.

BRIEF DESCRIPTION OF DRAWINGS

FIG. 10 is the netlist of the two parallel bondwires of FIG. 9;

FIG. 12 is a schematic block diagram of apparatus according to the invention.

DETAILED DESCRIPTION OF THE INVENTION

Figure 1:
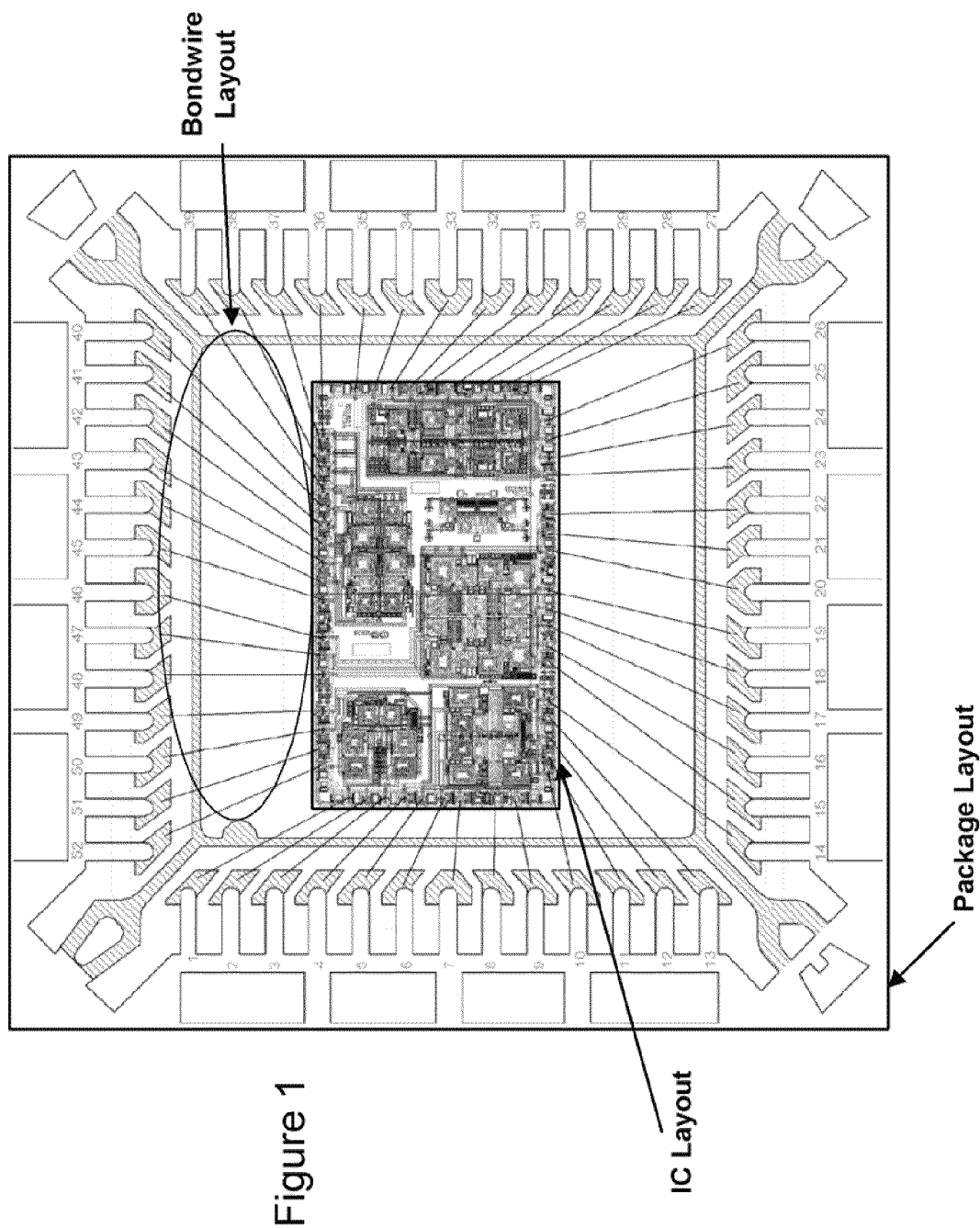
FIG. 1 depicts an image of a typical bondwire diagram as known in the prior art.
Figure 2:
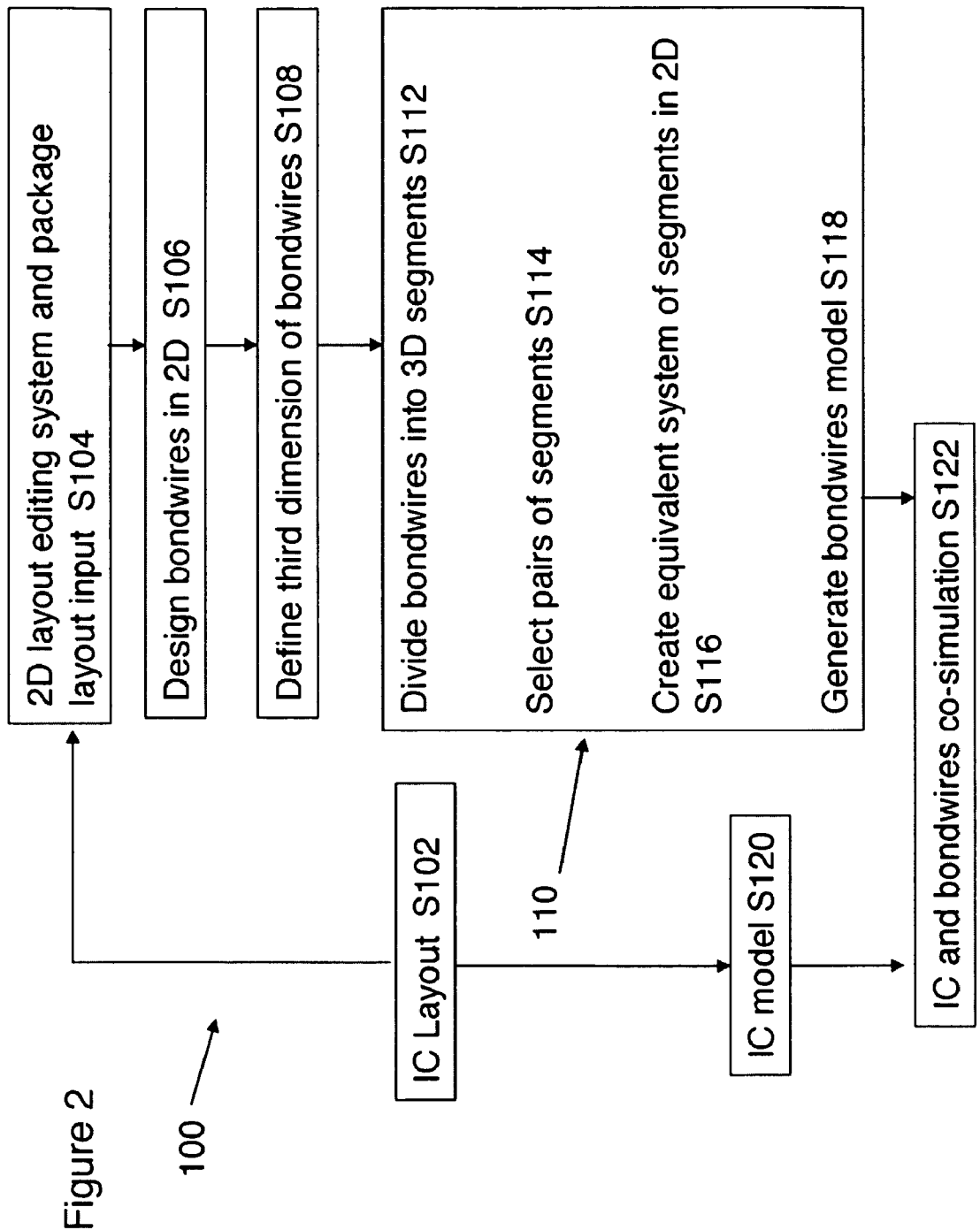
FIG. 2 shows a flowchart of an embodiment of the invention that enables the modelling of bondwire interconnects in the same environment used for IC circuit simulations.

As described above the present invention provides a method and apparatus for design and electromagnetic simulation of bondwire interconnects. FIG. 2 shows a flowchart of an embodiment of the invention that enables the modelling of bondwire interconnects. There is shown a process 100 comprising a first step of creating the IC layout at step S102; inputting and editing the IC layout design at step S104 by incorporating it into a 2D layout editing system with a package layout; design of the bondwire in 2D is detailed at step S106; defining the 3D model of the bondwires at step S108; and creating the bondwire wire model at step S110 which comprises the steps of: dividing the bondwire into segments at step S112; selecting a pair of segments at step S114; creating equivalent segments in 2D at step S116; and creating the bondwire model at step S118; creating the IC model at step S120; and creating an IC and bondwire simulation at step S122.

The IC layout is inputted in a 2D framework known in the art at step S102. The bondwires are designed by the user in a known two-dimensional (2D) layout editing system such as the Cadence Virtuoso® system, though any suitable 2D layout editing system may be used. Outline drawings of one or more integrated circuit (IC) dies and one or more package parts can also be inserted in the same layout editing system at step S104. These features allow for the accurate design and subsequent modelling of the bondwires and the IC in 2D at step S106.

Bondwires however are three dimensional objects and the third dimension of the bondwire must be defined in order to fully calculate the electromagnetic field of the bondwire. When designing bondwires in a 2D layout editing system, the user designs the projection of the bondwire along the 2D horizontal plane of the package and IC. What remains to be defined is the requisite third dimension describing the shape of the bondwire above the IC and the package.

Figure 3:
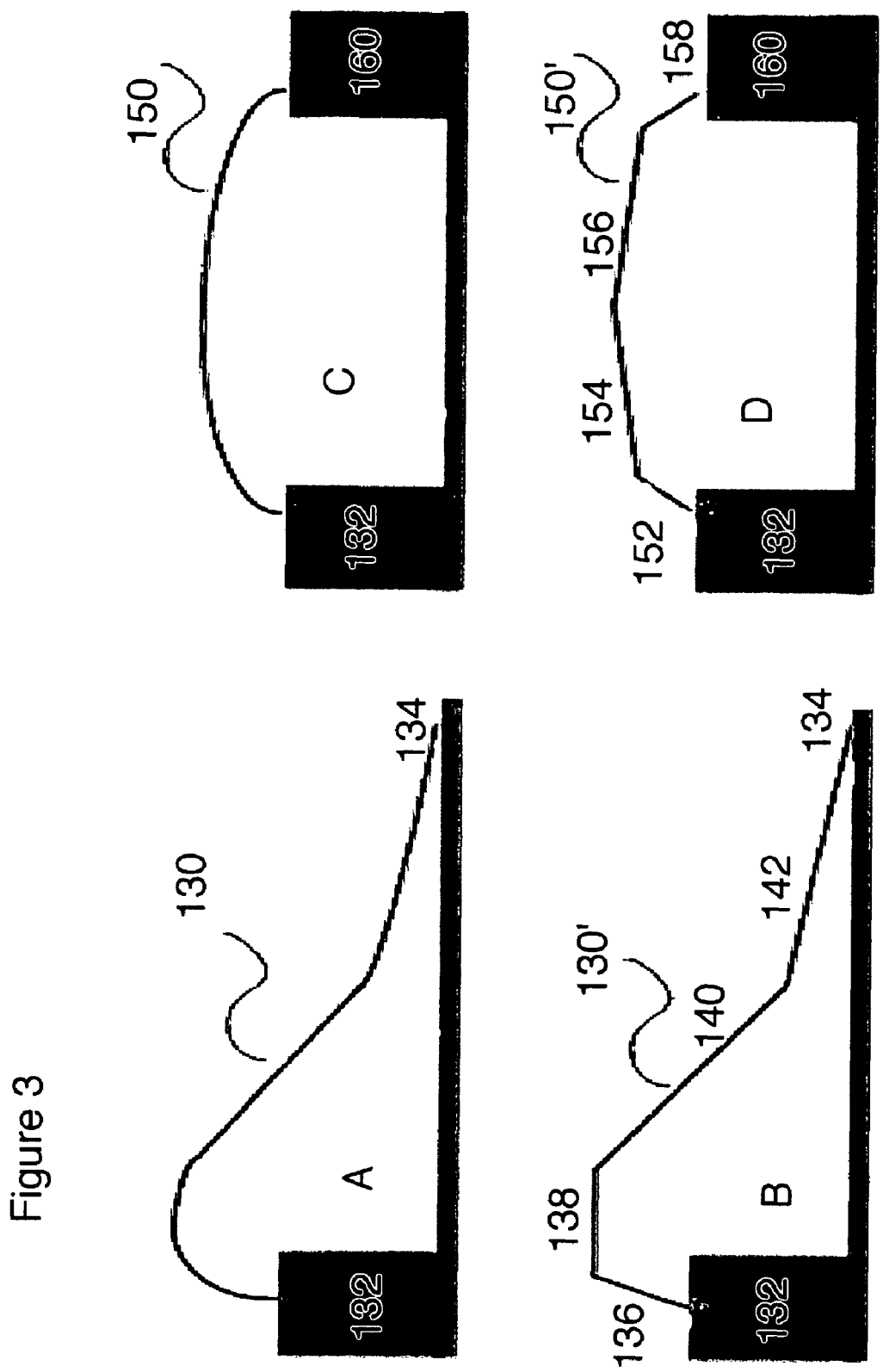
FIG. 3 shows an example of bondwires and the corresponding approximations using piecewise linear models.

FIG. 3 shows an example of the shape of a bondwire interconnect 130 which is between a layer of a circuit die 132 and a layer of a package 134. There is also shown another example in FIG. 3C of a bondwire interconnect 150 between two dice 132 and 160.

The actual shape of a bondwire interconnect 130, 150 resembles a curved line; a structure that is difficult and computationally inefficient accurately to capture and model. Therefore the 3D shape of the bondwire, or bondwire loop shape, is approximated using a combination of linear segments at step S110 of FIG. 2. Step S110 comprises four separate steps: dividing the bondwire into segments at step S112; selecting a pair of segments at step S114; creating equivalent segments in 2D at step S116; and creating the bondwire model at step S118.

The bondwire interconnects 130, 150 may be modelled as a series of segments at step S112. This is visually represented in FIG. 3B, where bondwire interconnect 130', is segmented into segments 136, 138, 140 and 142. A further example is bondwire interconnect 150' in FIG. 3D, which is segmented into segments 152, 154, 156 and 158. The number of segments used to define a bondwire interconnect may vary according to the needs of the user. Using smaller, more numerous segments results in a more accurate model of the interconnect but also corresponds to an increase in computational time.

In a preferred embodiment when the individual bondwires have been designed in 2D at step S106 they are defined in 3D by the user at steps S108 and S110. The user may define the bondwire from a variety of pre-defined wires which have pre-defined shape and segments or the user may draw the wire themselves thereby defining the shape. At this stage the user may also choose the number of segments the bondwire is divided into at step S112 in a user interface and preferably a graphical user interface (GUI). Preferably, when using a pre-defined bondwire shape the user may also manipulate individual segments to make minor adjustments. The combination of pre-defined and user defined bondwire shapes allows definition of any type of bondwire shape and helps minimise the time to create the bonding diagram thereby increasing efficiency.

The 3D shape, e.g. loop shape, of the bondwire and all parameters necessary to completely define this shape (including the diameter of the cross-section of the wise) are annotated by means of suitable parameters stored in the bondwire drawing object. Therefore the parameters that define a 3D shape may be stored as part of a 2D diagram ensuring an easy integration between the 2D and 3D aspect of the invention. For instance, in the Cadence Virtuoso® layout editing system these parameters can be annotated by means of suitable Component Description Format (CDF) values stored in a PCell object that presents a bondwire.

Figure 3E:
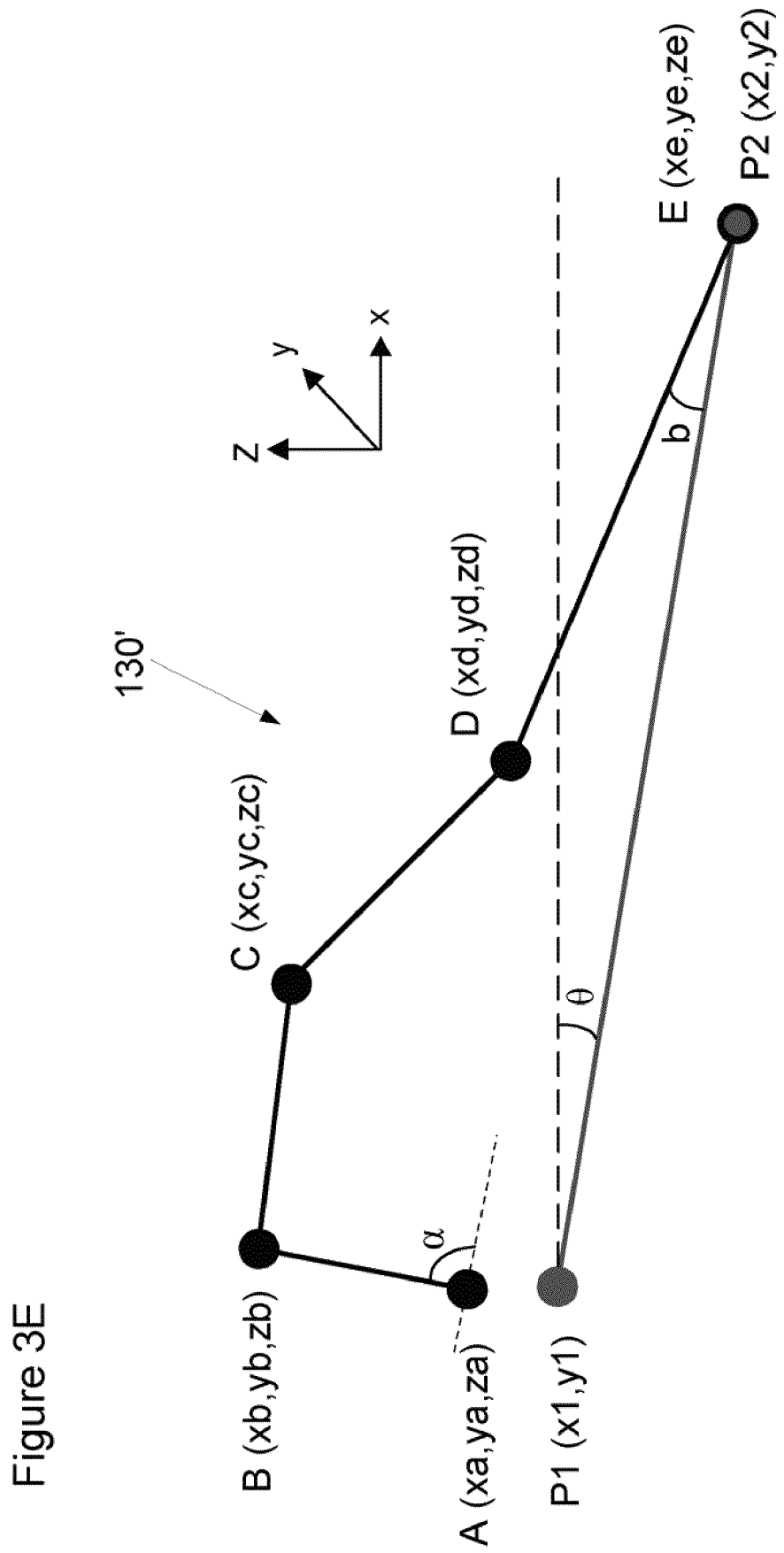

For example, the data provided by the user can be a single line, connecting the start and end points of the wire, and the bondwire model type or loop shape. In the example of FIG. 3E the user defines the straight line from P1 to P2 and the loop shape. The process that is presented below produces four segments in the 3D space.

Precalculations:

$$d = \sqrt{(x_2 - x_1)^2 + (y_2 - y_1)^2}$$  Equation 1 distance between points $P1, P2$ $$\theta = \arctan\left(\frac{y_2 - y_1}{x_2 - x_1}\right)$$  Equation 2 corner between direction of $xx'$ axis and $\overrightarrow{P_1P_2}$

TABLE 1

Bond-wire 3D coordinates

|  | x | y | z |
|---|---|---|---|
| Point A | $x_a = x_1$ | $y_a = y_1$ | $z_a = h_2 + z_{ref}$ |
| Point B | $x_b = x_a + h_1 \cdot \cot\alpha \cdot \cos\theta \cdot s$ | $y_b = y_a + h_1 \cdot \cot\alpha \cdot \sin\theta \cdot s$ | $z_b = h_1 + h_2 + z_{ref}$ |
| Point C | $x_c = x_b + \frac{d}{8} \cdot \cos\theta \cdot s$ | $y_c = y_b + \frac{d}{8} \cdot \sin\theta \cdot s$ | $z_c = z_b$ |
| Point D | $x_d = x_a + \frac{d}{2} \cdot \cos\theta \cdot s$ | $y_d = y_a + \frac{d}{2} \cdot \sin\theta \cdot s$ | $z_d = \frac{d}{2} \cdot \tan b + z_{ref}$ |
| Point E | $x_e = x_2$ | $y_e = y_2$ | $z_a = z_{ref}$ |

$Z_{ref}$ is the reference plane at the level of the package wire-bond pad (point E in FIG. 3E).

Using the above transformations the bondwire designed in 2D is represented with a series of vectors ($\vec{AB}$, $\vec{BC}$, $\vec{CD}$, $\vec{DE}$) that efficiently describe its 3D characteristics.

At steps S114, S116 and S118 an electromagnetic model of the bondwire interconnects is generated. According to an embodiment of the invention there is provided a means for defining the complex shapes of the bondwire interconnects. The process of modelling the EM behaviour of bondwire interconnects 130,150 is described in full detail with reference to FIG. 4. Each segment that defines the bondwire interconnect (e.g. in FIG. 3, bondwire interconnect 130 comprises segments 156, 138, 140 and 142), is modelled using RLC elements (resistance, inductance and capacitance) and the resulting models for each segment are combined in series.

For modelling effects such as mutual inductance and coupling capacitance among segments of the same bondwire or of different bondwires, a pair of segments is selected at step S114 and transformed from the 3D geometry to a 2D geometry at step S16. This allows the EM behaviour to be modelled in 2D, considerably simplifying the calculations used to model EM behaviour. The RLC elements for each bondwire segment and the coupling capacitance (C) and mutual inductance (K) elements are combined to create the bondwire model at step S118. The transformation and EM modelling is explained in detail with reference to FIGS. 5 and 6.

From the IC layout defined at step S102 an IC model may be determined at step S120 using known IC modelling techniques. The IC model is expressed using a netlist, and the 3D bondwire model may also be described as a netlist, therefore allowing for the IC model and bondwire model to be combined at step S122 to create an IC and bondwire co-simulation.

In order to fully capture the electromagnetic behaviour of bondwire interconnects, a full RLCK (resistance, inductance, capacitance, mutual inductance) model netlist is constructed. Construction of this netlist involves modelling each linear segment of the selected piecewise linear geometric approximation as defined at step S112, and connecting the resulting equivalent circuits in series; it also involves modelling the one-to-one couplings of all segments, and adding appropriate C and K entries to the netlist. The model thus constructed contains all necessary circuit elements to capture complex electromagnetic effects such as self and mutual inductances, frequency-dependent resistance and capacitive coupling.

Figure 4:
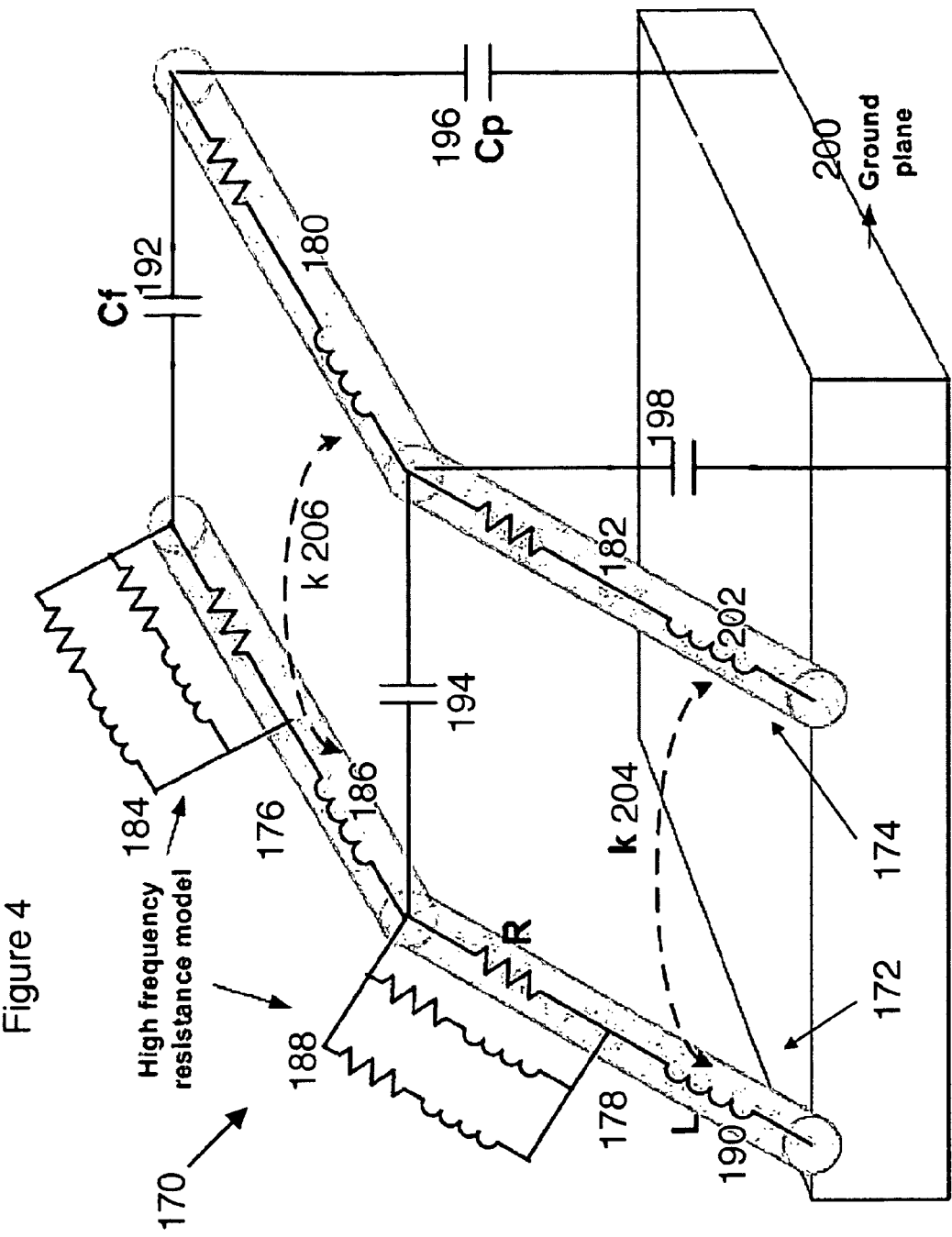
FIG. 4 shows an example of representation of bondwire segments and the EM interactions between them using an RLCK netlist.

FIG. 4 shows an example of a pair of bondwires divided into segments and the interactions between them modelled using an RLCK netlist. There is shown the modelled bond-wire interconnects 170, a first bondwire 172 with a first segment 176 and a second segment 178, a second bondwire 174, with a first segment 180 and a second segment 182. The bondwires have been represented as a netlist with the high frequency resistance component 184 of segment 176 and inductor 186 of segment 176, high frequency resistance component 188 and self-inductance 190 of segment 178, coupling capacitances 192, 194, wire to ground plane capacitances 196, 198, ground plane 200, self-inductance 202, mutual inductances 204 and 206 between pairs of segments.

Apart from the geometrical characteristics of bondwires that are defined at step S110 as described with reference to FIG. 3 several parameters are used in the modelling process, as follows:

Metal resistivity (Ohm*m) through knowledge of the electrical properties of the bondwire metal to calculate of ohmic losses;

Injection mould dielectric constant ($\in_{r1}$) to account for insertion of plastic injection mould between the wires which affects the capacitive coupling between bondwires;

Presence of bottom ground plane between the wires affects the behaviour of the model;

Substrate dielectric constant ($\in_{r1}$) of a bottom ground plane.

The electromagnetic behaviour of each of the bondwire segments 174, 176, 178, 180, using methods known in the art, are defined to a first level approximation by resistance, capacitance, inductance and mutual inductance elements. Higher frequency resistance models 184, 188 may be modelled using several resistors and capacitors in parallel.

Once the bondwire interconnects 170 are represented with an equivalent circuit model, the circuit component values for each segment are calculated. Calculation of self-resistance and self-inductance for each segment requires the parameters detailed above. These calculations are implemented using closed-form expressions. Calculation of the mutual coupling (magnetic 204 and capacitive 192, 194) between bondwires 172 and 174, and between the bondwires and the surrounding space (package, ground plane 200) is not straightforward. The methodologies used in planar interconnect modelling cannot be directly implemented due to the geometric complexity of bondwire shapes, comprising non-parallel segments positioned arbitrarily in the three-dimensional space. A model of these effects in 3D is computationally expensive to implement and therefore undesirable.

To overcome his obstacle, the segments that are defined in the bondwire models 176, 178, 180, 182 are examined in pairs. For each pair of segments e.g. 176 and 180 or 178 and 182, a series of transformations is necessary to transform the 3D system of segments into an equivalent 2D system. The calculation of the mutual inductance and capacitance effects in 2D is considerably easier than in 3D and therefore less computationally expensive to implement. This greatly increases the efficiency of the invention over methods known in the prior art.

An example of the method of the transformations is described below with reference to FIGS. 5 and 6. The particular values and configurations discussed in these non-limiting examples can be varied and are cited merely to illustrate at least one embodiment and are not intended to limit the scope of the invention.

Figure 5:
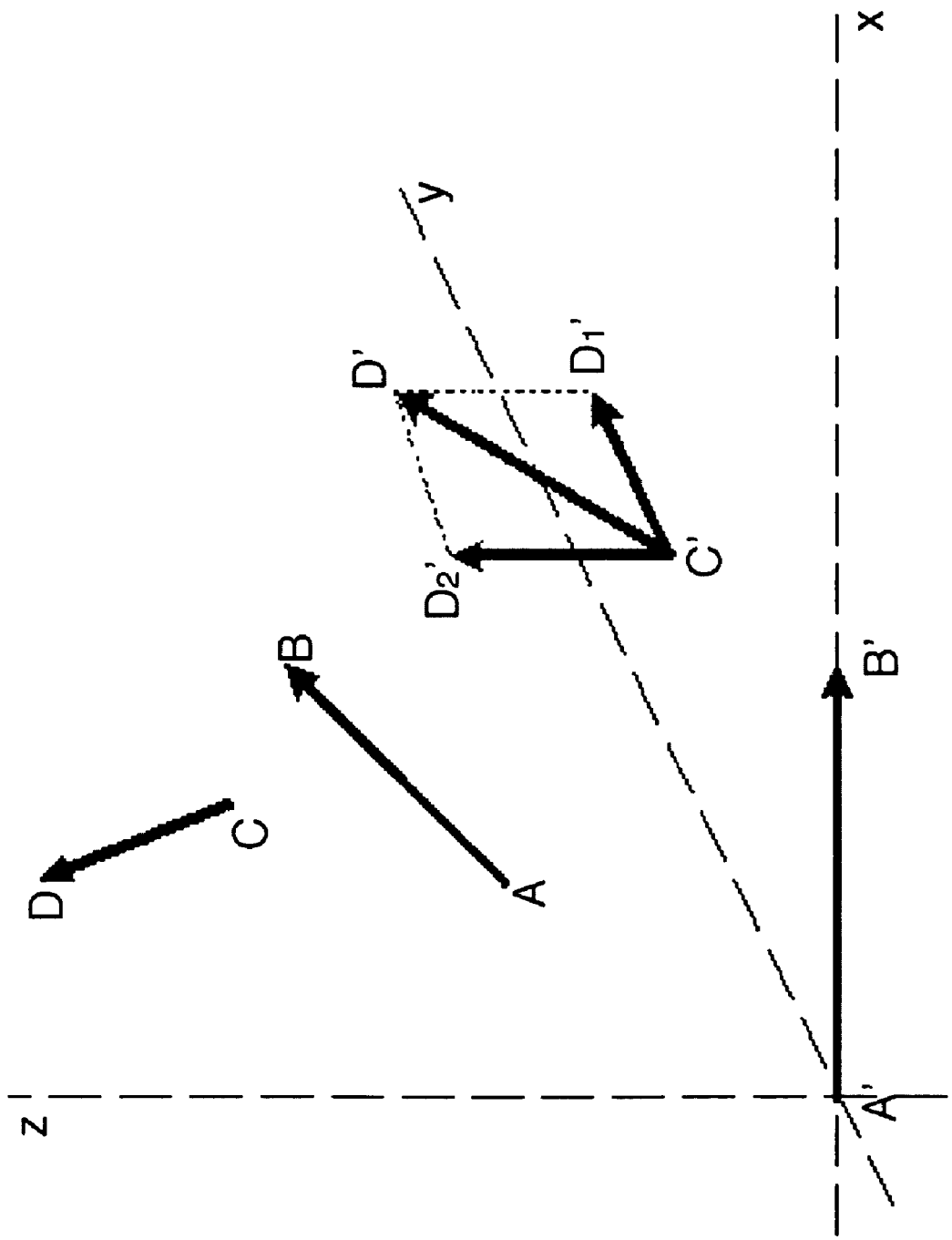
FIG. 5 shows the methodology for calculating the magnetic interaction between two arbitrary segments in the 3D space.

FIG. 5 shows an example, of two arbitrary segments defined by vectors (AB) and (CD) in orthogonal x, y, z space. There is shown vectors (AB) and (CD), and translated vectors (A'B') and (C'D').

Through a series of transformations, the vector-system is moved to the centre of the x y z axes and then rotated, so that vector (AB) now lies along the x axis. The result is the equivalent system of vectors (A'B') and (C'D'). These transformations are conducted using vector transformation techniques. Vector (C'D') can be further analyzed into components (C'D'$_1$) and (C'D'$_2$). Vector (C'D'$_2$) is orthogonal to (A'B'); therefore it has no contribution to the overall inductive coupling. Calculation of magnetic coupling between vectors (A'B') and (C'D'$_1$) is greatly simplified as both vectors are in the same plane and well-know closed-form formulas can be used to obtain their mutual inductance. The magnetic coupling calculated between vectors (A'B') and (C'D'$_1$) is the same to that of the original vectors (AB) and (CD). Therefore the deprojection of the vectors onto a common plane (here the xy plane) has greatly simplified the problem from a 3D problem to a much simpler 2D problem. Those skilled in the art will understand that the vectors may be rotated onto any mutual plane.

While inductive coupling relates to electric current flow, capacitive coupling relates to electric charges. A slightly different procedure is followed for the calculation of the capacitive coupling between segments of bondwires As with FIG. 5, the system of vectors (AB) and (CD) is transformed to the equivalent system of (A'B') and (C'D'). However, for the purpose of capacitive coupling calculation, analysis of the second vector into components, as in the case of magnetic inductance, will not help towards simplifying the problem. A different procedure is needed, which is described below, for the case of coplanar and non-coplanar wire segments.

Figure 6:
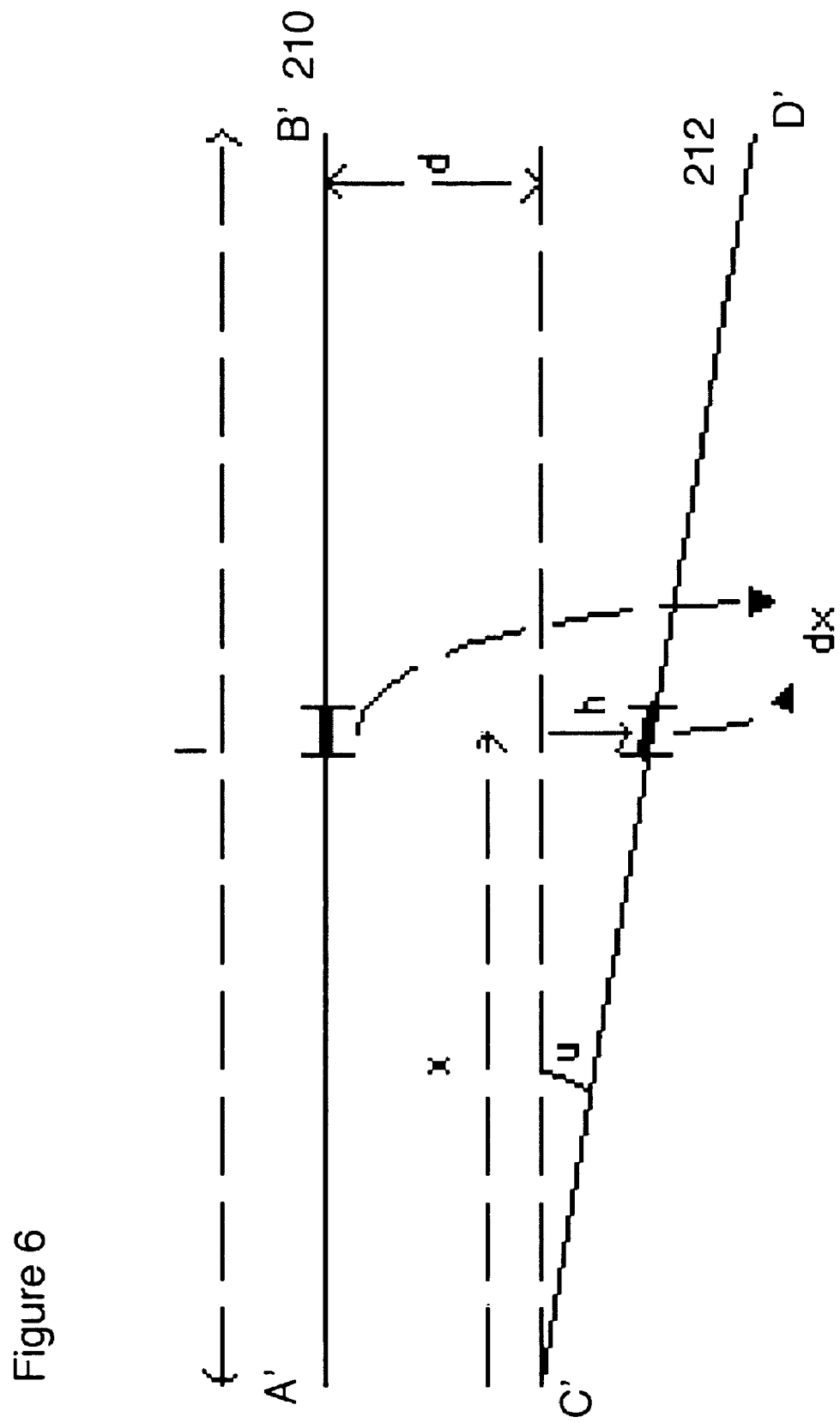
FIG. 6 shows the methodology for calculating the capacitive interaction between two arbitrary segments in the 3D space, for the case of coplanar non-parallel segments.

FIG. 6 shows an example of two co-planar and non-parallel wire segments. There is shown the first segment 210 and the second segment 212. The minimum distance between the two segments is represented as d. The two segments are discretized into infinitesimal segments (dx) while h represents the additional distance that must be added to d, for each infinitesimal segment. The relative position of each infinitesimal segment along the horizontal axis is represented by x. Also shown are the angle u which defines the angle between the second segment 212 and the first segment 210, and the projection of segment 212 on segment 210, symbolized as 1.

The calculation of capacitance between two parallel round wires can be performed using closed-form equations. In the general case, the examined segments 210, 212 are non-parallel, and here define an angle of separation u. The procedure entails discretizing the two segments into smaller segments of infinitely small length. The infinitesimal segments of vectors (A'B') and (C'D') can be considered to be parallel and the closed form expressions can be used to calculate their capacitive coupling. The overall capacitance can be calculated by integrating the capacitance between infinitesimal segments along the common projection 1 of the two segments 210,212.

If Cp is the capacitance calculated for each pair of the infinitesimal segments dx, then the total capacitance between the vectors can be calculated through a simple integration:

$$C = \int_0^l C_p(x)dx \qquad \text{Equation 3}$$

Where:

$$C_P(x) = \frac{\pi \cdot \varepsilon_o \varepsilon_r}{\log\left(\frac{d+h(x)}{\sqrt{a_1 \cdot a_2}}\right)} = \frac{\pi \cdot \varepsilon_o \varepsilon_r}{\log\left(\frac{d+x \cdot \tan u}{\sqrt{a_1 \cdot a_2}}\right)} \qquad \text{Equation 4}$$

where $\varepsilon_o$ is the permittivity of free space, $\varepsilon_r$ is the dielectric constant of the material between the segments and a is the diameter of each of the wires.

Figure 7:
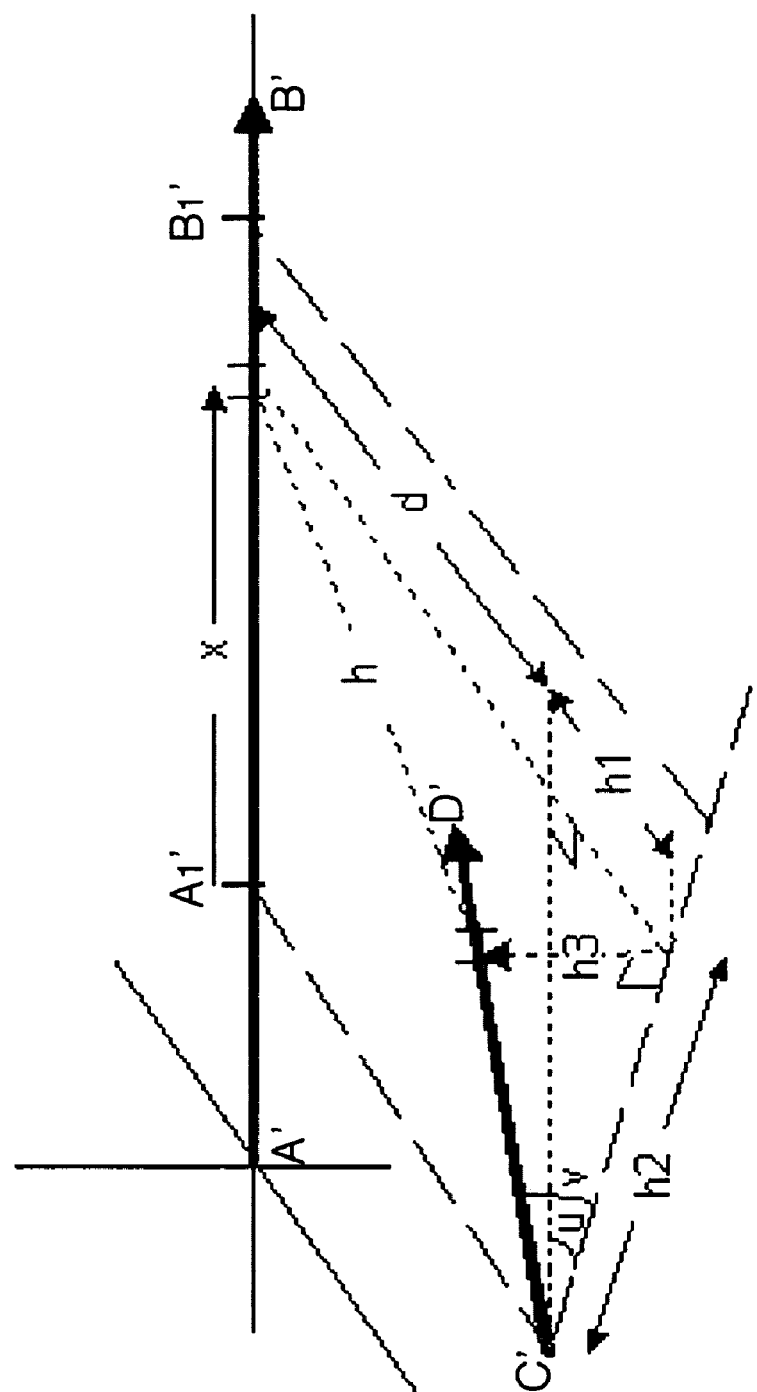
FIG. 7 shows the methodology for calculating the capacitive interaction between two arbitrary segments in the 3D space, for the case of non-coplanar, non-parallel segments.

FIG. 7 shows an example of two non-coplanar and non-parallel wise segments. The symbols used are similar to the ones of FIG. 6. The same procedure of discretization and integration as described in the case of FIG. 6 is also applied. However due to the fact that the vectors are non-coplanar, the equation that relates the distance h between two parallel infinitesimal segments to the integration variable x, is more complex and is calculated through the following set of equations:

$$h(x) = \sqrt{(d+h_1(x))^2 + h_2(x)^2} \qquad \text{Equation 5}$$

$$h_1(x) = x \cdot \tan u \qquad \text{Equation 6}$$

$$h_2(x) = h_3(x) \cdot \tan v = x \cdot \tan v \cdot \sqrt{(\tan u)^2 + 1} \qquad \text{Equation 7}$$

where d is the smaller distance between the two vectors, and u and v are the angles defining the orientation of vector (C'D'). Angles u and v can be directly calculated since the start and end points of vectors (A'B') and (C'D') are known. For someone skilled in the art, it should be straightforward to calculate of h(x) from the above set of equations 5, 6, 7 and subsequently calculate coupling capacitance C from equations 3 and 4.

Figure 8:
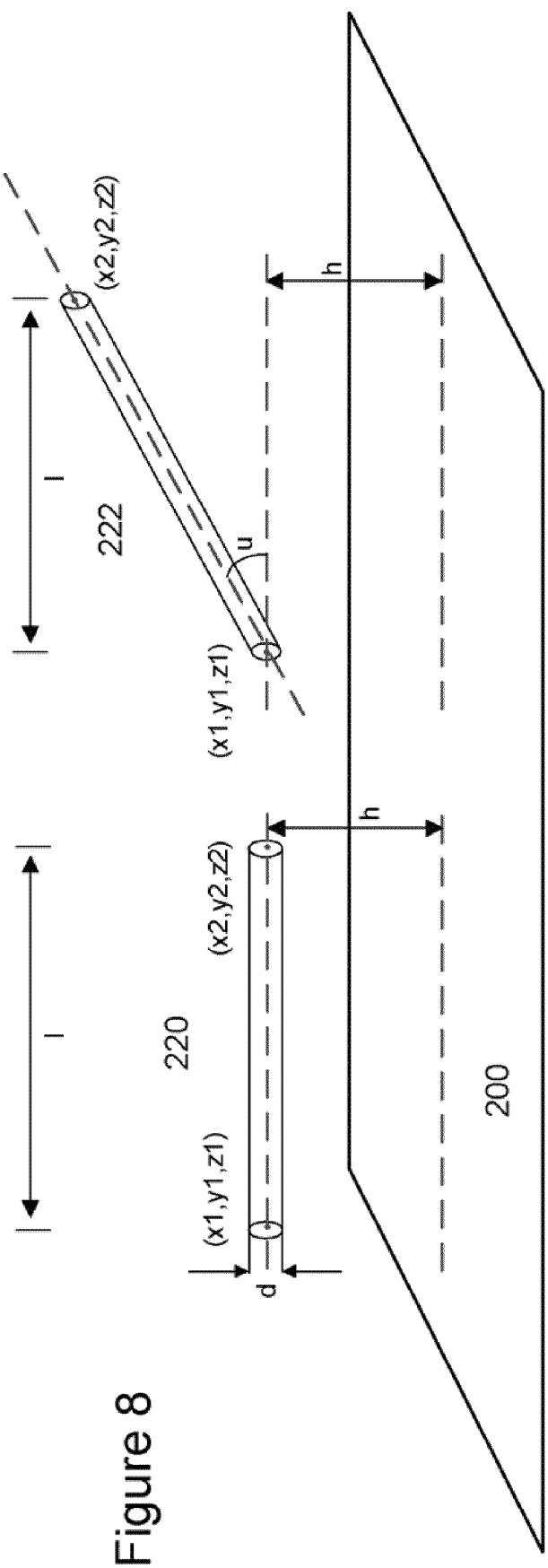
FIG. 8 shows the methodology for calculating the capacitive coupling between one arbitrary segment in the 3D space and the underlying horizontal ground plane.

The same methodology is followed for the calculation of capacitance between bondwires and the walls of the package, or any other defined reference plane. FIG. 8 shows an example of two segments of bondwire over a ground plane. There is shown the ground plane 200, a parallel bondwire segment 220 to the ground plane 200 and a non-parallel bondwire segment 222. Both segments are of length 1, with segment 222 at an angle u to segment 220 and the ground plane 200. The calculation of the capacitance $C_{gnd}(X)$ of a round wire over a parallel ground plane 200 can be again performed using closed-form equations (such as Equation 8), and is a function of the segment's length 1.

$$C_{gnd}(x) = \frac{\varepsilon_r \cdot 0.05563}{\ln\left(\frac{4 \cdot h(x)}{d}\right)}(fF/um) \qquad \text{Equation 8}$$

To calculate the capacitance between a segment and a non-parallel plane, the segment is divided into smaller segments of infinitely small length. Each segment can be considered parallel to the ground plane, and the total capacitance is calculated through a simple integration:

$$C = \int_0^l C_{gnd}(x)dx \qquad \text{Equation 9}$$

The capacitance of parallel segment 220 need not be calculated via the integration method described above and because it is parallel to the ground plane 200 may be solved using a single closed form equation (such as Equation 8) over the length 1 of the segment.

Figure 9:
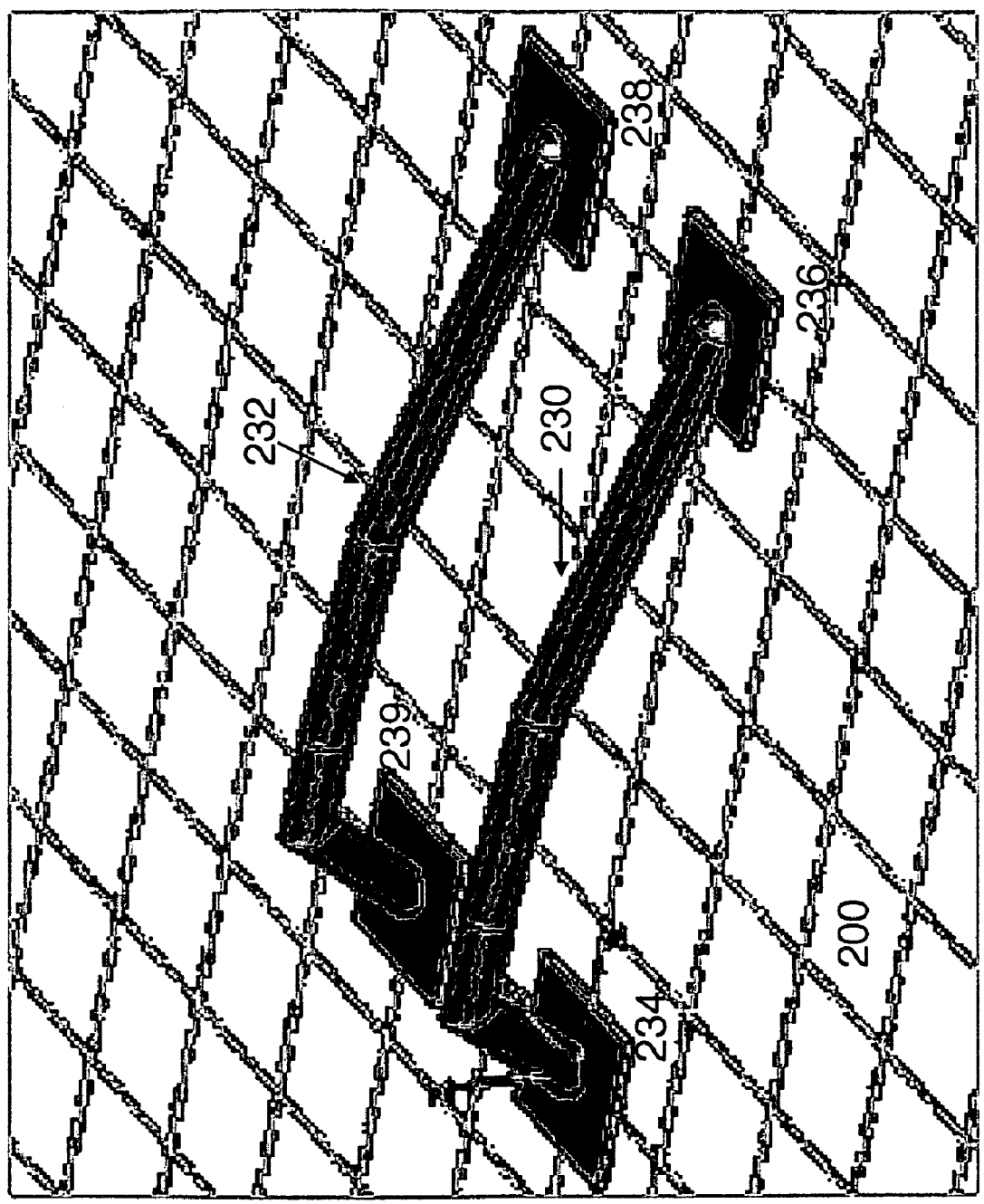
FIG. 9 is a model of two parallel bondwires in an embodiment of the invention.

FIG. 9 shows an example of two parallel bondwires that have been defined in the invention at step S108 of FIG. 2. There is shown bondwire 230 connecting between points 234 and 236, bondwire 232 connecting between points 238 and 239, and ground plane 200.

FIG. 10 shows the netlist that has been determined by the invention, which fully models the EM behaviour of the two bondwires. There is shown the self-inductance and resistance values 240 and the mutual coupling values 242. In particular here, though netlists can have variations in form, the first column represents the component reference and the property of that component such that L_bond_0_0 is the inductance of bondwire segment bond_0_0. The second and third columns represent the connection nodes, e.g. p3 and p3_m, in the electrical circuit of the component identified in the first column, and the fourth column is the modeled value of the respective property of the component; i.e. inductance (L) in Henrys, capacitance (C) in Farads, resistance (R) in Ohms, mutual inductance (K, as unitless ratios).

The netlist shown in FIG. 10 describes fully the 3D behaviour of the bondwires. This advantageously allows for the netlist to be incorporated into known IC circuit models as at step S122 of FIG. 2. Such integration with other known modelling systems is impractical or inefficient with the prior art which is unable to perform 3D modelling or bondwires in a time-efficient manner and directly generate netlists that can be co-simulated with IC circuitry. The present invention therefore increases the efficiency of bondwire modelling, especially when incorporated with known IC modelling, design and simulation techniques.

Figure 11:
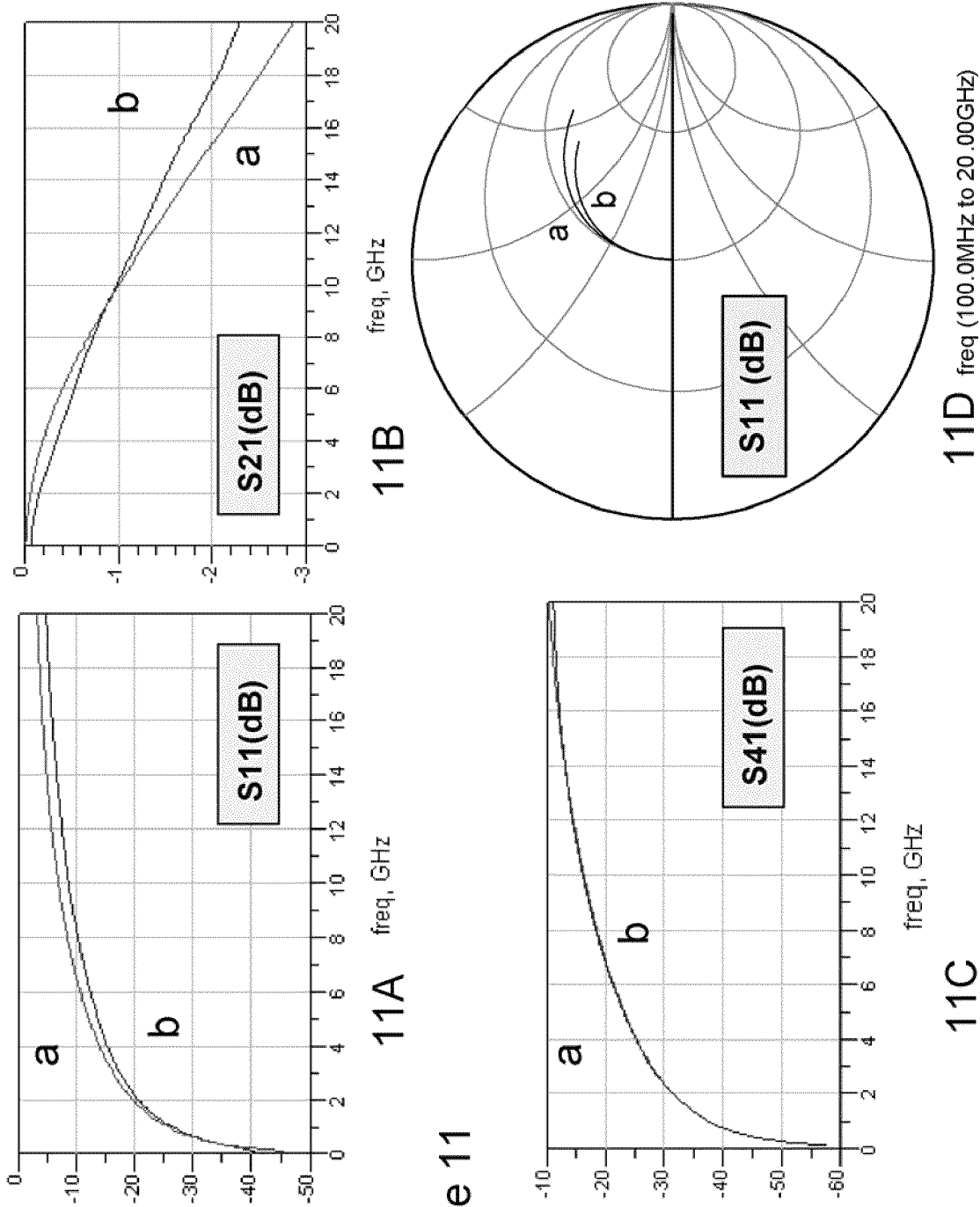
FIG. 11 is a graphical comparison of the model of the electromagnetic behaviour as calculated by the invention compared to the results achieved using a full model of the prior art.

FIG. 11 shows a comparison of the results obtained from the modelling of the EM behaviour of the present invention compared to a full 3D EM field solver, in terms of scattering parameters (S-Parameters). S-parameters are an accurate way to represent the linear electromagnetic behaviour of a microwave structure. In FIG. 11 the S-parameter results of the invention and those of a 3D solver over a range of decibel levels and frequencies are shown.

The line closest to the letter "a" represents the results according to the present invention and the line next to "b" the prior art. For example, with reference to FIG. 11, S11 represents the return loss for example at connection point (node) 234 shown in FIG. 9, S21 represents the transmission loss between connection points 234 and 236, and S41 represents the transmission loss between connection points 234 and 238. As can be seen from the plots the results obtained by the present invention are almost identical to those obtained using a full 3D solver. Additionally, when modelling the bondwires the present invention for this simple example was able to model the bondwires approximately 75 times faster than the 3D solver modelling the bondwires in approximately 4 seconds compared to 6 minutes as required by the 3D solver using the same computer. The efficient calculations required to model the bondwires according to the invention are a great improvement over the prior art.

The rapid calculations allow for the improvements in modelling where slight changes in an co-simulated IC bondwire model would not be desirable due to the lack of integration between IC and bondwire modelling and the time taken to recalculate the EM behaviour. It is very common in bondwire design, that a slight change in die placement may be necessary and subsequently the EM behaviour would need to be recalculated.

Moreover, the rapid calculations enabled by the invention can be exploited in the modelling of large arrays of bondwires, potentially scaling up to the total number of bondwires comprising an IC package (typically tens or hundreds), whereby all EM effects such as magnetic and capacitive coupling may be comprehensively captured. Such scalability is usually impractical using prior art methods such as EM solvers, for reasons of processing time, memory and computing resources.

In a preferred embodiment the invention also allows for the import/export of the netlists and drawings in a number of common formats further increasing the compatibility between the modelled netlists and known IC and package design environments.

Referring to FIG. 12 there is shown a schematic view of apparatus 250 according to the invention comprising a computer 252, having a processor 254 such as microprocessor e.g. from Intel or Motorola for example, a display 256 preferably enabling a graphical user interface 258 in combination with user input devices 260 and 262, such as keyboard, mouse or other interactive device(s) to enable a user to interact with the processor 252 via GUI 258 for example to enable positioning of a bondwire in an electrical circuit and determination of a 3D shape of the bondwire. Preferably the apparatus or system 250 further comprise means to enable communication between computer 252 and external devices such as a computer attached to a network 266 or a fabrication apparatus 268 such as a wire bonder machine. Network 266 might be a local area network LAN, or multiple interconnected networks including the Internet for example. In one form computer 252 is integrated in a fabrication apparatus 268 thereby enabling direct creation, modelling and fabrication in a single machine of an electrical device, such as a packaged IC, having suitable bondwiring.

The invention claimed is:

1. A method of determining the electromagnetic characteristics of bondwires in an electrical circuit, comprising the steps of:
    defining, using a computer including a non-transitory computer readable medium and processor, a position of a bondwire in an electrical circuit layout;
    defining a 3D position of the bondwire in the electrical circuit layout;
    representing the bondwire by one or more discrete segments;
    determining electromagnetic characteristics including inductance, resistance and capacitive coupling, of each of the segments, as a single workflow process thereby to determine overall electromagnetic characteristics of the bondwire, using a procedure comprising the steps of
    calculating the resistance, self inductance and self capacitance for each segment using closed-form equations
    selecting a pair of segments
    projecting the segments using vector analysis onto a common plane; and
    calculating using closed form equations at least one of
        the mutual inductance between the segments using their projections onto the common plane, and
        the coupling capacitance between the segments using their projections onto the common plane; and
    repeating the above steps for all pairs of segments.

2. The method of claim 1 further comprising:
    enabling a user to determine a loop shape of the bondwire, wherein the loop shape is selected by the user from a predetermined range of loop shapes, using a graphical user interface.

3. The method of claim 1 further comprising:
    enabling a user to determine a loop shape of the bondwire, wherein the loop shape is selected automatically based on properties of the electrical circuit such as selected interconnecting nodes of the bondwire within the electrical circuit.

4. The method of claim 1 wherein the bondwire is further defined by one or more of:
    diameter of the bondwire;
    bondwire metal resistivity;
    injection mould dielectric constant;

presence of a ground plane or other electromagnetic shield; and substrate dielectric constant.

5. The method of claim 1 further comprising the step of:

determining the electromagnetic coupling between a bondwire segment and at least one proximal element in the electrical circuit wherein the relative positions of the bondwire segment and the proximal element are analyzed using vector analysis; and determining the electromagnetic coupling of two or more proximal elements, wherein each proximal element is at least one of a second bondwire segment forming part of the bondwire, a segment of a proximal bondwire, and a proximal component.

6. The method of claim 5 wherein determining the electromagnetic coupling includes determining mutual inductance between the elements.

7. The method of claim 5 wherein determining the electromagnetic coupling includes determining coupling capacitance between the elements and wherein the coupling capacitance is determined by dividing each bondwire segment and each proximal element into a plurality of infinitesimal sections, calculating the coupling capacitance between the plurality of infinitesimal sections, and integrating across each bondwire segment to calculate the coupling capacitance of each bondwire segment.

8. The method of claim 1 further comprising the use of a graphical user interface to enable a user to select the position of a bondwire in the electrical circuit, wherein the graphical user interface enables the user to define the position in a 2D representation of the electrical circuit and in a 3D representation of the electrical circuit.

9. The method of claim 1 further comprising the step of characterizing one or more bondwires in an electrical circuit and generating an output of the characteristics of all or part of the bondwires as a netlist.

10. The method of claim 9 wherein the overall electromagnetic characteristics include resistance, inductance, capacitance, and mutual inductance (RLCK) of the bondwire.

11. The method of claim 1 further comprising:

modeling of the self-inductance and resistance of the individual bondwire segments; and wherein results of the modeling are stored in a format suitable for integration with known integrated circuit modeling and or manufacturing packages as a netlist.

12. A non-transitory computer readable medium, including instructions stored thereon, which when read and executed by a computer cause the computer to perform the steps of:

defining, using a computer including a non-transitory computer readable medium and processor, a position of a bondwire in an electrical circuit layout;

defining a 3D position of the bondwire in the electrical circuit layout;

representing the bondwire by one or more discrete segments;

determining electromagnetic characteristics including inductance, resistance and capacitive coupling, of the or each of the segments, as a single workflow process thereby to determine overall electromagnetic characteristics of the bondwire, using a procedure comprising the steps of calculating the resistance, self inductance and self capacitance for each segment using closed-form equations selecting a pair of segments projecting the segments using vector analysis onto a common plane; and calculating using closed form equations at least one of the mutual inductance between the segments using their projections onto the common plane, and the coupling capacitance between the segments using their projections onto the common plane; and repeating the above steps for all pairs of segments.

13. The non-transitory computer readable medium of claim 12 further comprising the steps of:

determining the electromagnetic coupling between a bondwire segment and at least one proximal element in the electrical circuit wherein the relative positions of the bondwire segment and the proximal element are analyzed using vector analysis; and determining the electromagnetic coupling of two or more proximal elements, wherein each proximal element is at least one of a second bondwire segment forming part of the bondwire, a segment of a proximal bondwire, and a proximal component.

14. The non-transitory computer readable medium of claim 13 wherein determining the electromagnetic coupling includes determining mutual inductance between the elements.

15. The non-transitory computer readable medium of claim 14 wherein determining the electromagnetic coupling further includes determining coupling capacitance between the elements and wherein the coupling capacitance is determined by dividing each bondwire segment and each proximal element into a plurality of infinitesimal sections, calculating the coupling capacitance between the plurality of infinitesimal sections, and integrating across each bondwire segment to calculate the coupling capacitance of each bondwire segment.

16. The non-transitory computer readable medium of claim 15 further comprising the step of characterizing one or more bondwires in an electrical circuit and generating an output of the characteristics of all or part of the bondwires as a netlist.

17. The non-transitory computer readable medium of claim 16 wherein the overall electromagnetic characteristics include resistance, inductance, capacitance, and mutual inductance (RLCK) of the bondwire.

18. A system for determining the electromagnetic characteristics of a bondwire in an electrical circuit, comprising:

a computer including a non-transitory computer readable medium and a processor;

a user interface to enable a user to define the position of the bondwire in the electrical circuit;

an input device suitable for defining one or more bondwire interconnects;

a logic adapted to determine the position of the bondwire in a 3D representation of the electrical circuit and to segment the bondwire into discrete segments;

a modeler to model the electromagnetic behavior including inductance, resistance and capacitive coupling, of each segment, as a single workflow process thereby to model each segment as a netlist, using a procedure comprising the steps of:

calculating the resistance, self inductance and self capacitance for each segment using closed-form equations, selecting a pair of segments, projecting the segments using vector analysis onto a common plane, calculating using closed form equations at least one of:

the mutual inductance between the segments using their projections onto the common plane, and the coupling capacitance between the segments using their projections onto the common plane, and repeating the above steps for all pairs of segments; and a writeable memory for storing the netlist.

19. A method of manufacturing an electrical circuit comprising the steps of:

using at least one of a model, characterization, and definition of an electrical circuit according to the method of defining, using a computer including a non-transitory computer readable medium and processor, a position of a bondwire in an electrical circuit layout, defining a 3D position of the bondwire in the electrical circuit layout, representing the bondwire by one or more discrete segments, determining electromagnetic characteristics including inductance, resistance and capacitive coupling, of each of the segments, as a single workflow process thereby to determine overall electromagnetic characteristics of the bondwire, using a procedure comprising the steps of calculating the resistance, self inductance and self capacitance for each segment using closed-form equations selecting a pair of segments projecting the segments using vector analysis onto a common plane; and calculating using closed form equations at least one of the mutual inductance between the segments using their projections onto the common plane, and the coupling capacitance between the segments using their projections onto the common plane; and repeating the above steps for all pairs of segments; and assembling components of the electrical circuit having bondwires according to the model, characterization, and definition.

20. The method of manufacturing an electrical circuit of claim 19 wherein the step of using at least one of a model, characterization, and definition of an electrical circuit includes creating the at least one of a model, characterization, and definition of an electrical circuit.

21. A method of manufacturing an electrical circuit comprising the steps of:

using at least one of a model, characterization, and definition of an electrical circuit according to the method of dividing bondwires in segments, using a computer including a non-transitory computer readable medium and processor, determining electromagnetic characteristics including inductance, resistance and capacitive coupling, of each of the segments, as a single workflow process thereby to determine overall electromagnetic characteristics of the bondwire, using a procedure comprising the steps of:

calculating the resistance, self inductance and self capacitance for each segment using closed-form equations, selecting a pair of segments, projecting the segments using vector analysis onto a common plane, and calculating using closed form equations at least one of:

the mutual inductance between the segments using their projections onto the common plane, and the coupling capacitance between the segments using their projections onto the common plane, and repeating the above steps for all pairs of segments; and assembling components of the electrical circuit having bondwires according to the model, characterization, and definition.

22. The method of manufacturing an electrical circuit of claim 21 wherein the step of using at least one of a model, characterization, and definition of an electrical circuit includes creating the at least one of a model, characterization, and definition of an electrical circuit.

23. A method of manufacturing an electrical circuit comprising the steps of:

accepting at least one of a model, characterization, and definition of an electrical circuit according to the method of defining, using a computer including a non-transitory computer readable medium and processor, a position of a bondwire in an electrical circuit layout, defining a 3D position of the bondwire in the electrical circuit layout, representing the bondwire by one or more discrete segments, determining electromagnetic characteristics including inductance, resistance and capacitive coupling, of each of the segments, as a single workflow process thereby to determine overall electromagnetic characteristics of the bondwire, using a procedure comprising the steps of calculating the resistance, self inductance and self capacitance for each segment using closed-form equations selecting a pair of segments projecting the segments using vector analysis onto a common plane; and calculating using closed form equations at least one of the mutual inductance between the segments using their projections onto the common plane, and the coupling capacitance between the segments using their projections onto the common plane; and repeating the above steps for all pairs of segments; and assembling components of the electrical circuit having bondwires according to the model, characterization, and definition.

* * * * *